(12) United States Patent
Jang et al.

(10) Patent No.: US 11,044,017 B2
(45) Date of Patent: Jun. 22, 2021

(54) MIMO-OFDM OF OPTICAL WIRELESS SYSTEM USING SCREEN

(71) Applicant: KOOKMIN UNIVERSITY INDUSTRY ACADEMY COOPERATION FOUNDATION, Seoul (KR)

(72) Inventors: Yeong Min Jang, Seoul (KR); Van Trang Nguyen, Seoul (KR)

(73) Assignee: KOOKMIN UNIVERSITY INDUSTRY ACADEMY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 16/494,608

(22) PCT Filed: Dec. 13, 2017

(86) PCT No.: PCT/KR2017/014660
§ 371 (c)(1),
(2) Date: Dec. 10, 2019

(87) PCT Pub. No.: WO2018/169170
PCT Pub. Date: Sep. 20, 2018

(65) Prior Publication Data
US 2020/0145109 A1 May 7, 2020

(30) Foreign Application Priority Data

Mar. 14, 2017 (KR) .......... 10-2017-0031961
Apr. 11, 2017 (KR) .......... 10-2017-0046887

(51) Int. Cl.
*H04B 10/00* (2013.01)
*H04B 10/516* (2013.01)
*H04B 10/116* (2013.01)

(52) U.S. Cl.
CPC ......... *H04B 10/516* (2013.01); *H04B 10/116* (2013.01)

(58) Field of Classification Search
CPC .................... H04B 10/516; H04B 10/116
(Continued)

(56) References Cited

U.S. PATENT DOCUMENTS

| | | | |
|---|---|---|---|
| 8,942,571 B2 * | 1/2015 | Chen | H04B 10/116 398/172 |
| 2005/0259844 A1 | 11/2005 | Kot et al. | |
| 2016/0037017 A1 * | 2/2016 | Morovic | H04N 1/32224 358/3.28 |

FOREIGN PATENT DOCUMENTS

WO  2015/106635 A1  7/2015

OTHER PUBLICATIONS

Byung Wook Kim et al. ("Display Field Communication: Fundamental Design and Performance Analysis", Journal of Lightwave Technology, vol. 33, No. 24, Dec. 15, 2015). (Year: 2015).*

(Continued)

*Primary Examiner* — Mohammad R Sedighian
(74) *Attorney, Agent, or Firm* — Goldilocks Zone IP Law

(57) ABSTRACT

An optical wireless transmission method according to an embodiment of the present invention comprises the steps of: a modulator receiving transmission data and a transmission image; the modulator generating a reference image on the basis of the transmission image; the modulator generating a data embedded image on the basis of the transmission data and the transmission image; and the transmitter sequentially transmitting the reference image and the data embedded image by means of a light source panel.

12 Claims, 14 Drawing Sheets

(58) Field of Classification Search
USPC .......................................................... 398/130
See application file for complete search history.

(56) References Cited

OTHER PUBLICATIONS

Byung Wook Kim et al., Display Field Communication: Fundamental Design and Performance Analysis, Journal of Lightwave Technology, Dec. 15, 2015, pp. 5269-5277, vol. 33, No. 24.

Mohammad Arif Hossain, Implementation of Invisible Data Embedding Scheme for Image Sensor Communication System, a thesis Submitted in partial fulfillment of the requirements for the degree of Master of Science, Graduate School, Kookmin University Department of Electronics Engineering, Jul. 2016, pp. 1-122.

Hao Lin et al, OFDM/OQAM with Hermitian Symmetry: Design and Performance for Baseband Communication, ICC 2008, IEEE International Conference on, May 30, 2008, pp. 652-656.

\* cited by examiner

MIMO-OFDM OF OPTICAL WIRELESS SYSTEM USING SCREEN

CROSS REFERENCE TO RELATED PATENT APPLICATION

This application claims the benefit under 35 U.S.C. Section 371, of PCT International Application No. PCT/KR2017/014660, filed on Dec. 13, 2017 which claimed priority to Korean Patent Application No. KR 10-2017-0031961, filed on Mar. 14, 2017 and Korean Patent Application No. KR 10-2017-0046887, filed on Apr. 11, 2017 the disclosures of which are hereby incorporated by the references.

TECHNICAL FIELD

The present invention relates to a method and an apparatus for optical wireless communication using a screen.

BACKGROUND ART

Recently, as the Visible Light Communication (VLC) technique, which enables wireless communication by adding communication functions to a visible light wavelength using an infrastructure in which lighting of incandescent bulbs or fluorescent tubes is replaced by Light Emitting Diode (LED) lighting, is actively studied and IEEE 802.15.7 international standard specification is completed, development of business models for commercialization is in progress. However, since IEEE 802.15.7 is generally limited to data transmission using a photo diode (PD), it has a problem in that a dedicated communication apparatus such as a VLC dongle or the like should be used. Accordingly, international standardization of Optical Wireless Communications (OWC), which mainly uses an image sensor such as a camera of a smart phone rather than a photo diode and includes infrared and ultraviolet wavelengths, as well as visible light, is progressed in IEEE 802.15.7mOWC TG (Task Group).

The inventor of the present invention is the chairman of IEEE 802.15.7m OWC TG of International Standard Organization, leading OWC international standardization by presenting many contributions related to OWC techniques, and the present invention relates to an optical wireless communication system using a screen, which is one of most essential techniques of OWC international standard techniques.

DISCLOSURE

Technical Problem

The present invention is directed to providing a method and an apparatus for optical wireless communication using a screen and an image sensor, etc.

Technical Solution

An optical wireless transmission method, according to an exemplary embodiment of the present invention, may comprise receiving, by a modulator, transmission data and a transmission image; generating, by the modulator, a reference image based on the transmission image; generating, by the modulator, a data-embedded image based on the transmission data and the transmission image; and sequentially transmitting, by a transmitter, the reference image and the data-embedded image through a light source panel.

In an exemplary embodiment, in the generating of the data-embedded image, the modulator may modulate at least portion of the transmission image according to the transmission data.

In an exemplary embodiment, in the generating of the reference image, the modulator may not modulate the portion of the transmission image in the data-embedded image, which is modulated according to the transmission data.

In an exemplary embodiment, the data-embedded image may be divided into m×n cells, and one cell of the m×n cells may be modulated by one bit of the transmission data.

In an exemplary embodiment, in the modulating of the transmission image, a change in a Cb channel of a YCbCr color space may be less than 0.008.

In an exemplary embodiment, the modulator may generate the data-embedded image by receiving successive transmission images, segment the transmission data into data blocks, insert an asynchronous symbol into each of the data blocks based on clock information of the data blocks, and modulate each of the successive transmission images according to each data block in which the asynchronous symbol is inserted.

In an exemplary embodiment, each of the reference image and the data-embedded image may have one or more reference cells in same positions.

In an exemplary embodiment, each of the reference image and the data-embedded image may have four reference cells at four corners.

In an exemplary embodiment, the one or more reference cells may be generated by modulating a portion of the transmission image corresponding to the one or more reference cells according to clock information.

In an exemplary embodiment, clock information included in a reference cell of the reference image and clock information included in a reference cell of the data-embedded image may have opposite phases.

In an exemplary embodiment, each of the reference image and the data-embedded image may have three or more reference cells, and clock information of one among the three or more reference cells and clock information of remaining reference cells may have opposite phases.

In an exemplary embodiment, the data-embedded image may be generated by modulating a portion of the transmission image other than a portion corresponding to the one or more reference cells according to the transmission data.

An optical wireless reception method, according to an exemplary embodiment of the present invention, may comprise receiving, by a receiver, continuously-photographed images of a light source panel from an image sensor; and restoring, by a demodulator, transmission data based on one of the images and a next image.

An optical wireless transmission method, according to an exemplary embodiment of the present invention, may comprise converting, by a modulator, transmission data into n complex symbol sequences; converting, by the modulator, the n complex symbol sequences into n Hermitian symmetric matrices, respectively; converting, by the modulator, the n Hermitian symmetric matrices into n first OFDM symbols, respectively; generating, by the modulator, n second OFDM symbols by adding a cyclic prefix (CP) to each of the n first OFDM symbols; generating, by the modulator, one frame image based on the n second OFDM symbols; and displaying, by a transmitter, the one frame image on a light source panel.

In an exemplary embodiment, each of the n Hermitian symmetric matrices, the n first OFDM symbols, and the n second OFDM symbols may be a two-dimensional matrix.

In an exemplary embodiment, the generating of the one frame image may comprise generating n third OFDM symbols by adding a DC bias to each of the n second OFDM symbols; and generating the one frame image based on the n third OFDM symbols.

In an exemplary embodiment, a magnitude of the CP may be one of values in Table 1.

In an exemplary embodiment, the optical wireless transmission method may further comprise adding zero padding to an edge of each of the n Hermitian symmetric matrices.

In an exemplary embodiment, component values of even-th columns of each of the n Hermitian symmetric matrices may be 0, and the generating of the one frame image may comprise zero-clipping each of then second OFDM symbols to generate n third OFDM symbols; and generating the one frame image based on the n third OFDM symbols.

In an exemplary embodiment, a magnitude of the cyclic prefix may be one of values in Table 2.

In an exemplary embodiment, the generating of the n second OFDM symbols by adding the CP to each of the n first OFDM symbols may comprise adding the CP to top, bottom, left, and right sides of each of then first OFDM symbols.

In an exemplary embodiment, the generating of the n second OFDM symbols by adding the CP to each of then first OFDM symbols may comprise adding the CP to top and left sides of each of the n first OFDM symbols.

In an exemplary embodiment, each of the n Hermitian symmetric matrices, the n first OFDM symbols, and the n second OFDM symbols may be a one-dimensional matrix.

In an exemplary embodiment, the generating of the one frame image may comprise generating n third OFDM symbols by adding a DC bias to each of the n second OFDM symbols; generating n fourth OFDM symbols by converting each of the n third OFDM symbols into two-dimensional data; and generating the one frame image based on the n fourth OFDM symbols.

In an exemplary embodiment, component values of even-th columns of each of the n Hermitian symmetric matrices may be 0, and the generating of the one frame image may comprise zero-clipping each of then second OFDM symbols to generate n third OFDM symbols; generating n fourth OFDM symbols by converting each of the n third OFDM symbols into a two-dimensional matrix; and generating the one frame image based on the n fourth OFDM symbols.

In an exemplary embodiment, the light source panel may be rectangular, the frame image may include rotation detection cells at four corners, and one of the rotation detection cells may flash with an opposite phase with remaining rotation detection cells.

In an exemplary embodiment, the rotation detection cells may be twice a size of OFDM symbol cells.

In an exemplary embodiment, the light source panel may be rectangular, and the frame image may include frame clock cells at four sides.

In an exemplary embodiment, the frame clock cells may flash with opposite phases to each other.

In an exemplary embodiment, edges for code detection may be provided at the corners of the frame image.

In an exemplary embodiment, the optical wireless transmission method may further comprise inserting, by the modulator, pilot sequences into the n Hermitian symmetric matrices; receiving, by the modulator, a channel estimation signal based on the pilot sequences from an optical wireless reception apparatus; and allocating, by the modulator, a power based on the channel estimation signal, wherein the converting of the transmission data into the n complex symbol sequences comprises converting the transmission data into the n complex symbol sequences based on the channel estimation signal.

An optical wireless reception method, according to an exemplary embodiment of the present invention, may comprise receiving, by a receiver, continuously-photographed images of a light source panel from an image sensor: detecting, by a modulator, a plurality of OFDM symbols from each of the images; and restoring, by the demodulator, different transmission data from each of the plurality of OFDM symbols.

An optical wireless transmission apparatus, according to an exemplary embodiment of the present invention, may comprise a modulator for receiving transmission data and a transmission image, generating a reference image based on the transmission image, and generating a data-embedded image based on the transmission data and the transmission image; and a transmitter for sequentially transmitting the reference image and the data-embedded image through a light source panel.

An optical wireless reception apparatus, according to an exemplary embodiment of the present invention, may comprise a receiver for receiving continuously-photographed images of a light source panel from an image sensor; and a demodulator for restoring transmission data based on one of the images and a next image.

An optical wireless transmission apparatus, according to an exemplary embodiment of the present invention, may comprise a modulator converting transmission data into n complex symbol sequences, respectively converting the n complex symbol sequences into n Hermitian symmetric matrices, respectively converting the n Hermitian symmetric matrices into n first OFDM symbols, generating n second OFDM symbols by adding a cyclic prefix (CP) to each of the n first OFDM symbols, and generating one frame image based on the n second OFDM symbols; and a transmitter displaying the one frame image through a light source panel.

An optical wireless reception apparatus, according to an exemplary embodiment of the present invention, may comprise a receiver for receiving continuously-photographed images of a light source panel from an image sensor; and a demodulator for detecting a plurality of OFDM symbols from each of the images, and restoring different transmission data based on the respective plurality of OFDM symbols.

The present invention includes a computer-readable recording medium on which a program for performing a method according to an exemplary embodiment of the present invention is recorded.

Advantageous Effects

According to the present invention, it is possible to efficiently perform optical wireless communication using a screen.

MODES OF THE INVENTION

Figure 1:
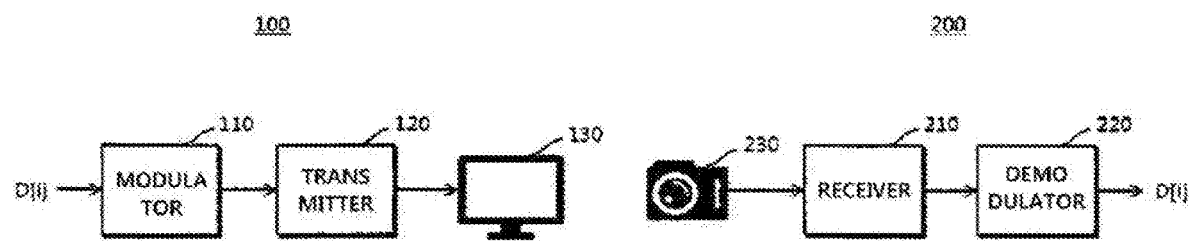
FIG. 1 is a diagram schematically illustrating a configuration of an optical wireless communication system according to an exemplary embodiment of the present invention.

Hereinafter, preferred embodiments of the present invention will be described in detail with reference to the accompanying drawings to clarify the spirit of the present invention. In describing the present invention, when it is determined that specific description of already known functions or constitutional components related to the present invention may make the gist of the present invention unclear, detailed description thereof will be omitted. Whenever possible, the same reference numerals and symbols are assigned to the constitutional components practically having the same functional configuration in the drawings although they are shown in different drawings. For the convenience of explanation, apparatuses and methods are described together in case of necessity.

FIG. 1 is a diagram schematically illustrating a configuration of an optical wireless communication system according to an exemplary embodiment of the present invention. Referring to FIG. 1, an optical wireless communication system according to an exemplary embodiment of the present invention includes an optical wireless transmission apparatus 100 and an optical wireless reception apparatus 200, the optical wireless transmission apparatus 100 may include a modulator 110 and a transmitter 120, and the optical wireless reception apparatus 200 may include a receiver 210 and a demodulator 220.

The modulator 110 may receive a transmission data signal and generate a frame image based on the received transmission data signal, and the transmitter 120 may display the generated frame image on a light source panel 130. The light source panel 130 may include all kinds of screens including a plurality of light sources such as a screen of a TV or a monitor, a screen of a mobile device, an LED sign, a signboard, and the like. The receiver 210 may receive images obtained by continuously photographing the light source panel from an image sensor 230, and the demodulator 220 may restore transmission data from the received images.

Figure 2:
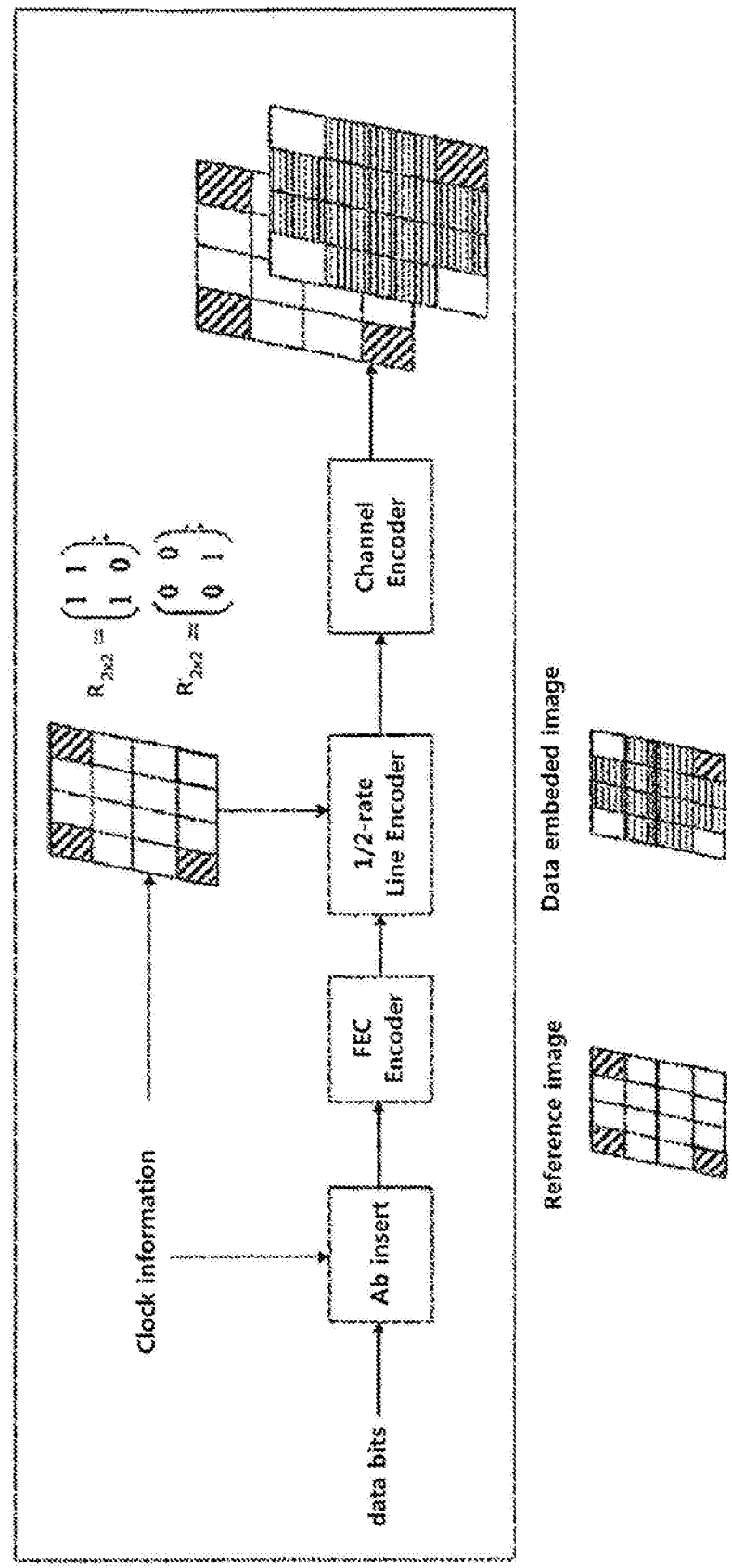
FIG. 2 is a diagram schematically illustrating a Hidden Asynchronous Quick Link (HA-QL) optical wireless communication system according to an exemplary embodiment of the present invention.

FIG. 2 is a diagram schematically illustrating a Hidden Asynchronous Quick Link (HA-QL) optical wireless communication system according to an exemplary embodiment of the present invention. Referring to FIG. 2, a modulator of the HA-QL optical wireless transmission apparatus may receive transmission data and a transmission image, and based on the received transmission data and transmission image, the modulator may generate a reference image and a data-embedded image. The data-embedded image is a transmission image in which at least a portion is modulated according to the transmission data, and the reference image is a transmission image in which the portion modulated according to the transmission data in the data-embedded image is not modulated according to the transmission data.

The transmitter may change intensities of pixels of the transmission image according to the transmission data to generate the data-embedded image, where the changing of the intensities does not necessarily mean changing a luminance, but may include any method of changing the state of the image. The transmitter may divide the transmission image into m×n cells and modulate the image for each cell.

The transmitter may sequentially transmit the reference image and the data-embedded image through the light source panel. The HA-QL optical wireless reception apparatus may restore the transmission data by comparing a photographed reference image with a photographed data-embedded image.

In more detail, the modulator may divide the transmission data into data blocks of a predetermined length, which can be transmitted as a pair of one reference image and one data-embedded image.

The modulator may insert an asynchronous symbol (i.e., Ab bits), which are data block clock information, into the data block so that the reception apparatus can operate correctly even when a frame rate changes. The asynchronous symbol may be one bit or two or more bits and may be inserted at a beginning of the data block. The asynchronous symbol may not be inserted separately, but a reference cell to be described later may serve as the asynchronous symbol.

The data block may be protected by inner encoding. In the HA-QL optical wireless communication system, outer encoding, interleaving, and inner encoding may be performed according to a following table.

| | Outer encoding | Interleaver (optional) | Inner encoding (optional) |
|---|---|---|---|
| PHR, PSDU, Ab bits | RS(15, 7) RS(15, 11) | n = 15 n = 15 | CC(1/4) CC(1/3) |

If the size of the transmission data does not match the size of the HA-QL code, the modulator may insert zero padding after the data.

The modulator may perform a half rate line coding on the transmission data to generate the reference image and the data-embedded image according to the transmission data. The line coding may be performed according to the following table.

| Binary input | RLL output | State of cell(i, j) |
|---|---|---|
| 0 | 0 0 | Cell state change does not exist between two image frames |
| 1 | 0 1 | Cell state change exists between two image frames |

Additionally, by placing one or more reference cells at the same positions of the reference image and the data-embedded image, the reference cells may be modulated according to clock information or rotation information without being modulated according to the transmission data. The clock information included in the reference cell of the reference image and the clock information included in the reference cell of the data-embedded image may have opposite phases. There may be three or more reference cells, and clock information of one of the three or more reference cells may have an opposite phase to those of the clock information of the other reference cells. The reception apparatus may detect a rotation of the HA-QL code from the phases of the reference cells. Four reference cells may be disposed at four corners of the image.

Cells other than the reference cells may be called data cells, and one data cell may be modulated according to one bit of the transmission data. The data-embedded image may include (m×n−4) transmission data bits because data cells which are a portion other than the reference cells are modulated according to the transmission data.

The modulation schemes on the reference cells and data cells of the reference image and the data image are summarized as follows.

| | Data block time (2i) | | Data block time (2i + 1) | |
|---|---|---|---|---|
| | Reference image | Data-embedded image | Reference image | Data-embedded image |
| m × n cells | | $C_{m \times n} = \begin{pmatrix} c_{0,0} & c_{0,1} & \cdots & c_{0,n-2} & c_{0,n-1} \\ c_{1,0} & c_{1,1} & \cdots & c_{1,n-2} & c_{1,n-1} \\ & & \cdots & & \\ c_{m-2,0} & c_{m-2,1} & \cdots & c_{m-2,n-2} & c_{m-2,n-1} \\ c_{m-1,0} & c_{m-1,1} & \cdots & c_{m-1,n-2} & c_{m-1,n-1} \end{pmatrix}$ | | |
| Reference cell $R_{2 \times 2} = \begin{pmatrix} c_{0,0} & c_{0,n-1} \\ c_{m-1,0} & c_{m-1,n-1} \end{pmatrix}$ | $\begin{pmatrix} 1 & 1 \\ 1 & 0 \end{pmatrix}$ | $\begin{pmatrix} 0 & 0 \\ 0 & 1 \end{pmatrix}$ | $\begin{pmatrix} 1 & 1 \\ 1 & 0 \end{pmatrix}$ | $\begin{pmatrix} 0 & 0 \\ 0 & 1 \end{pmatrix}$ |

The modulator may convert the data block into two matrices. The component values of the first matrix are all zeros, and the component values of the second matrix are transmission data bit values. Each component value of the matrix may be mapped to an intensity Pg(ij) as follows to control the data cell(i,j) of a HA-QL layer to be added in front of the transmission image.

bit 0: Pg(ij)=0
bit 1: Pg(ij)=1

Pg(ij)=0 and Pg(ij)=1 may indicate that the intensity of the data cell(i,j) is modulated and not modulated, respectively. When the data cell is modulated, a change of a Cb channel of a YCbCr color space may be less than 0.008 so that it is not recognized by a human eye.

The image sensor of the HA-QL optical wireless reception apparatus according to an exemplary embodiment of the present invention should photograph the light source panel at a frame rate that is three times or more of an optical clock rate to demodulate the HA-QL code.

Figure 3:
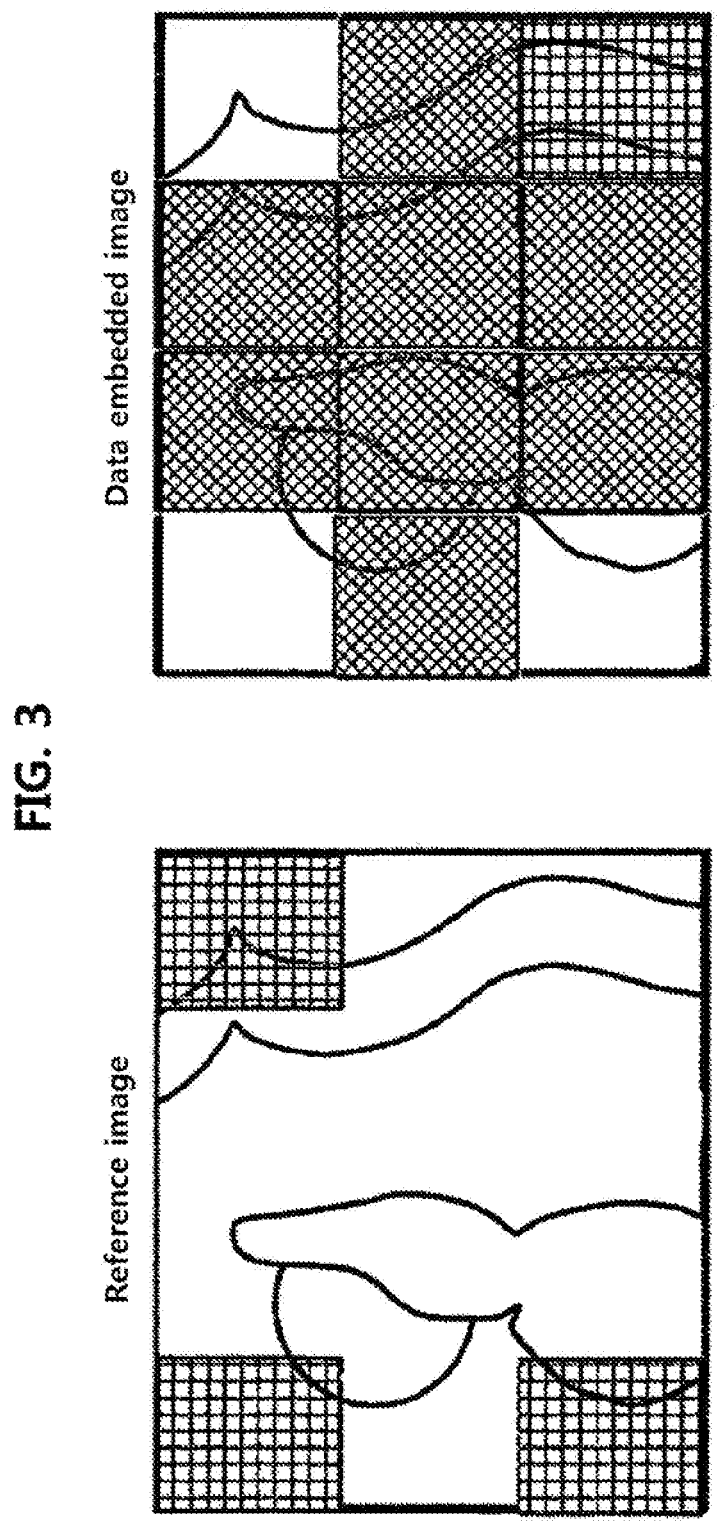
FIG. 3 is a diagram illustrating an example of reference image and data-embedded image photographed in an HA- QL optical wireless reception apparatus according to an exemplary embodiment of the present invention.

The demodulator of the HA-QL optical wireless reception apparatus may extract a code region from the image, and extract an intensity matrix of m×n from m×n hidden cells by comparing the data-embedded image with the adjacent reference image. FIG. 3 is a diagram illustrating an example of photographed reference image and data-embedded image.

Figure 4:
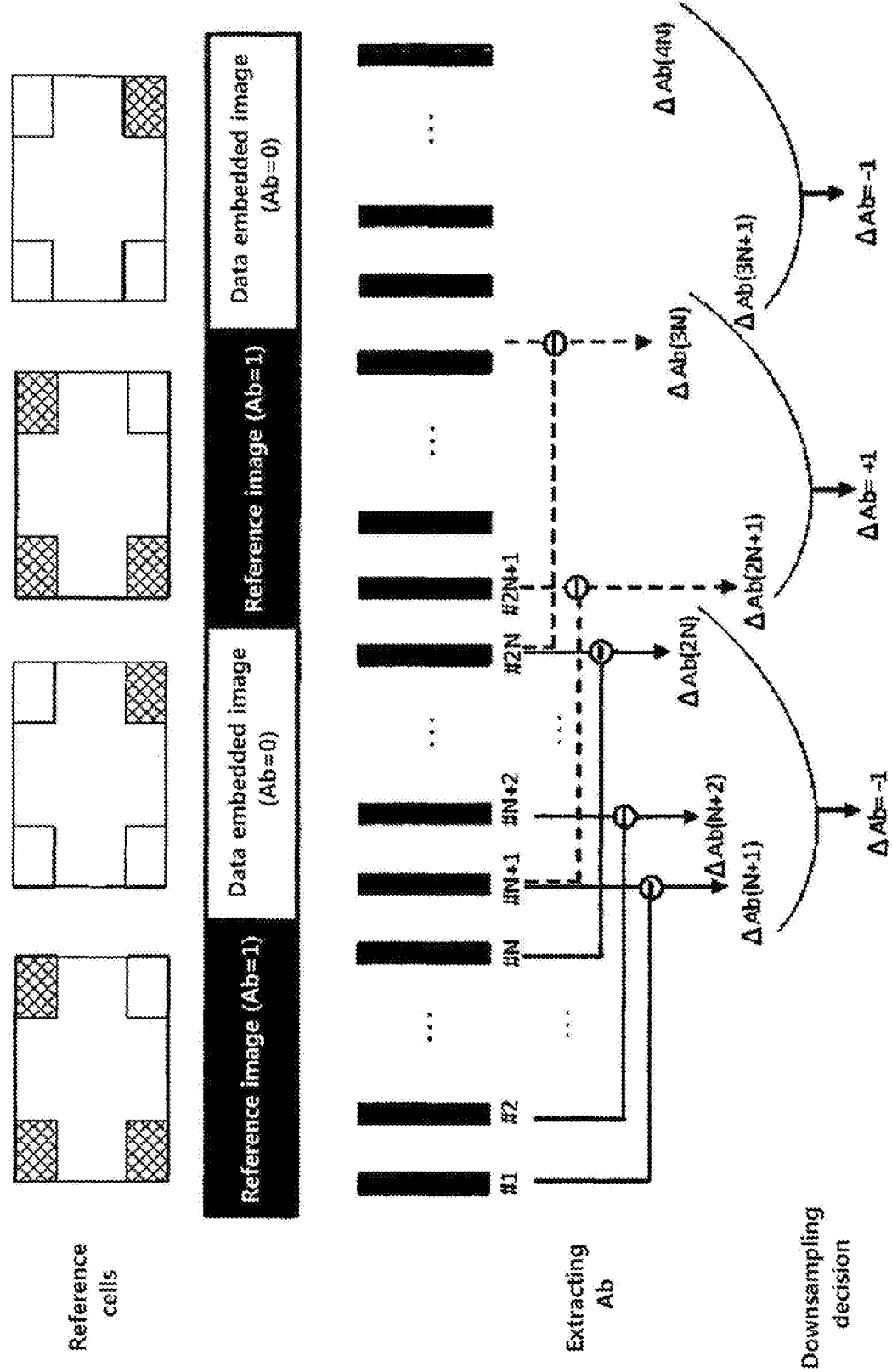
FIG. 4 is a diagram illustrating a downsampling method of an HA-QL optical wireless reception apparatus according to an exemplary embodiment of the present invention.

The demodulator may perform downsampling using the asynchronous symbol. FIG. 4 is a diagram illustrating a downsampling method of an HA-QL optical wireless reception apparatus according to an exemplary embodiment of the present invention. For example, when the frame rate of the reception apparatus is N times a transmission optical clock rate, ΔAb may be extracted for all sampling and downsampling decisions may be made based on the following.

$$\Delta Ab(i) = \text{Sampling}(i) - \text{sampling}(i-N)$$

Figure 5:
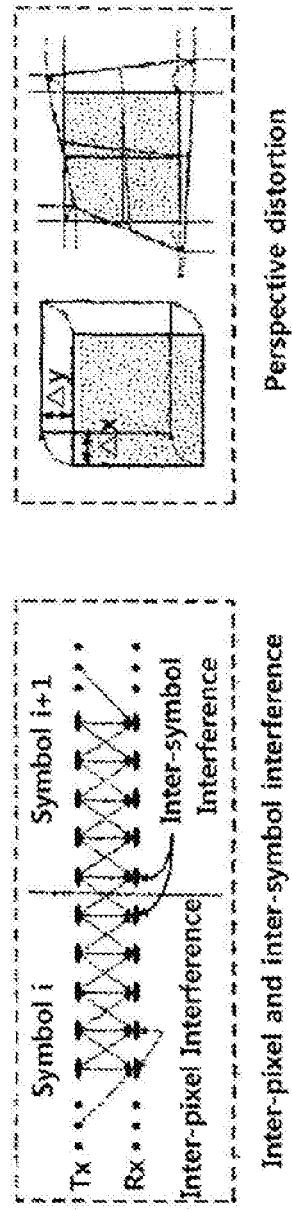
FIG. 5 is a diagram illustrating inter-pixel and inter-symbol interferences and perspective distortion.

When using a large number of cells for transmission over the screen, inter-pixel/inter-symbol interferences and perspective distortion may be a big problem. FIG. 5 is a diagram illustrating inter-pixel and inter-symbol interferences and perspective distortion. In order to solve this problem, an optical wireless communication system using OFDM is proposed.

Figure 6:
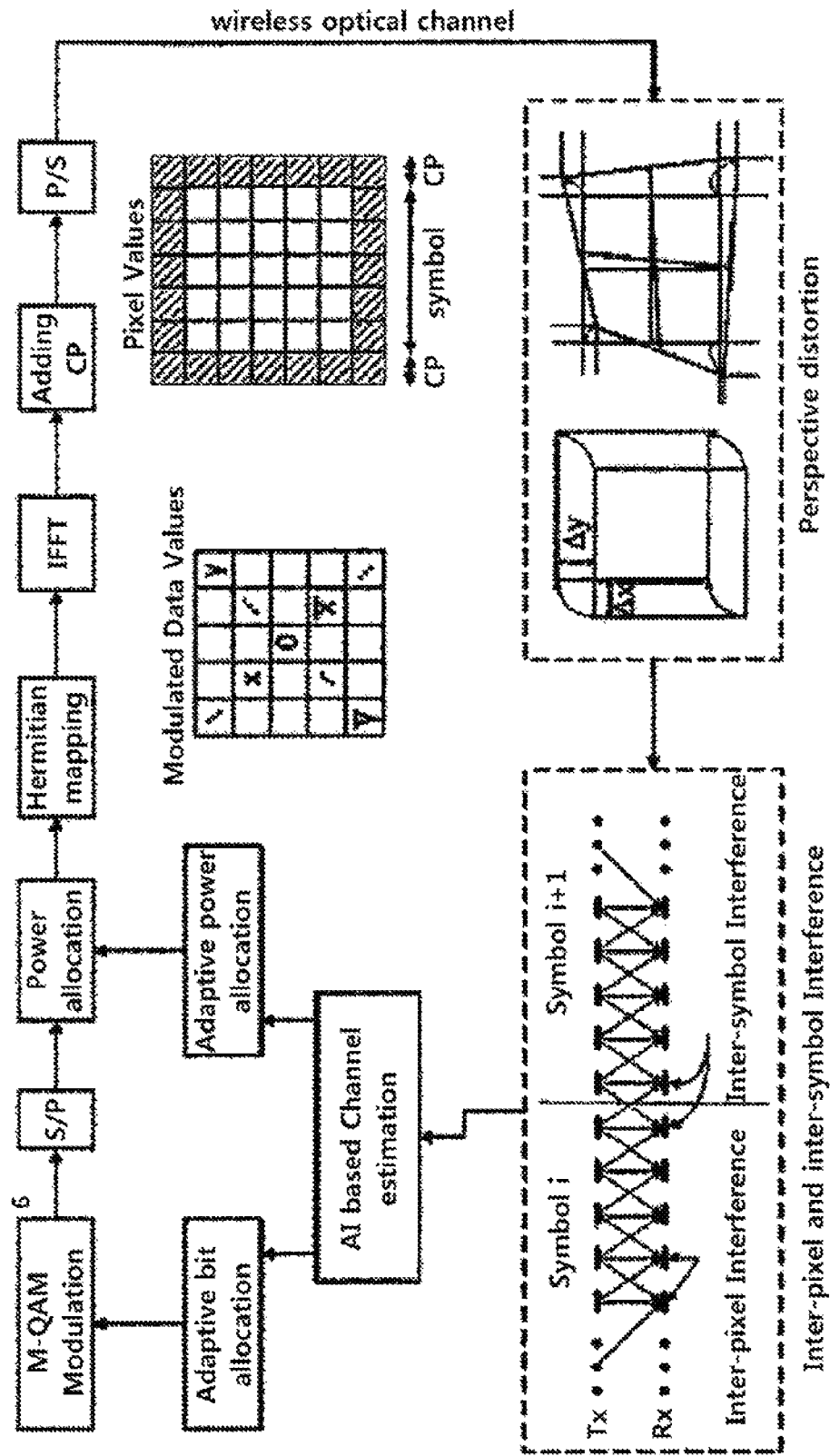
FIG. 6 is a diagram schematically illustrating an optical wireless communication system using OFDM according to an exemplary embodiment of the present invention.

FIG. 6 is a diagram schematically illustrating an optical wireless communication system using OFDM according to an exemplary embodiment of the present invention. Referring to FIG. 6, the modulator of the optical wireless transmission apparatus using OFDM may convert transmission data into complex symbols using QAM or the like. The modulator may generate a complex symbol sequence of a predetermined length to be transmitted in one OFDM symbol, and generate n complex symbol sequences for one frame when multiple OFDM symbols are included in one frame image to be displayed on the light source panel. n may be 1 or 2 or more. For example, when n=10×12=120 OFDM symbols are displayed in one frame and 144 complex symbols are included in one OFDM symbol, the modulator may generate 120 complex symbol sequences having a length of 144 for one frame.

The modulator may convert the n complex symbol sequences into n OFDM symbols each to generate one frame image. In the above example, the modulator may convert 120 complex symbol sequences into 120 OFDM symbols, respectively, to generate one frame image.

The modulator may convert each complex symbol sequence into a Hermitian symmetric matrix such that the OFDM symbol has real values to represent the intensity of the light source. The method of converting the complex symbol sequence to the Hermitian symmetric matrix is described later.

The modulator may convert the Hermitian symmetric matrix into an OFDM symbol using IFFT or the like. Since the OFDM symbol is converted into an OFDM symbol to be finally displayed on the screen through several steps, the OFDM symbol generated by converting the Hermitian symmetric matrix into the time domain may be referred to as a first OFDM symbol for convenience.

The modulator may add a cyclic prefix (CP) to the first OFDM symbol to generate a second OFDM symbol. The method of adding the CP to the first OFDM symbol is described again later.

Figure 7:
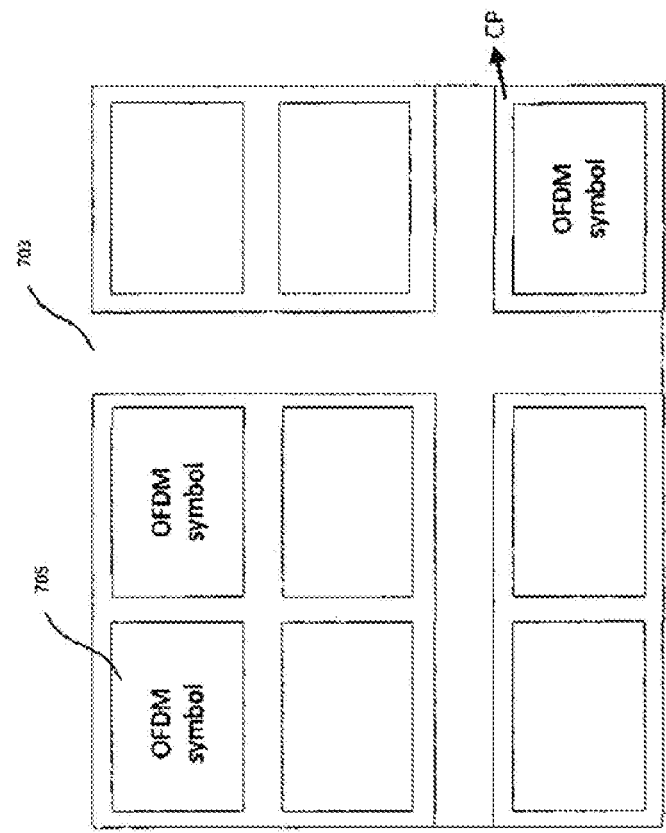
FIG. 7 is a diagram illustrating a frame image of an optical wireless communication system using OFDM according to an exemplary embodiment of the present invention.
Figure 7:
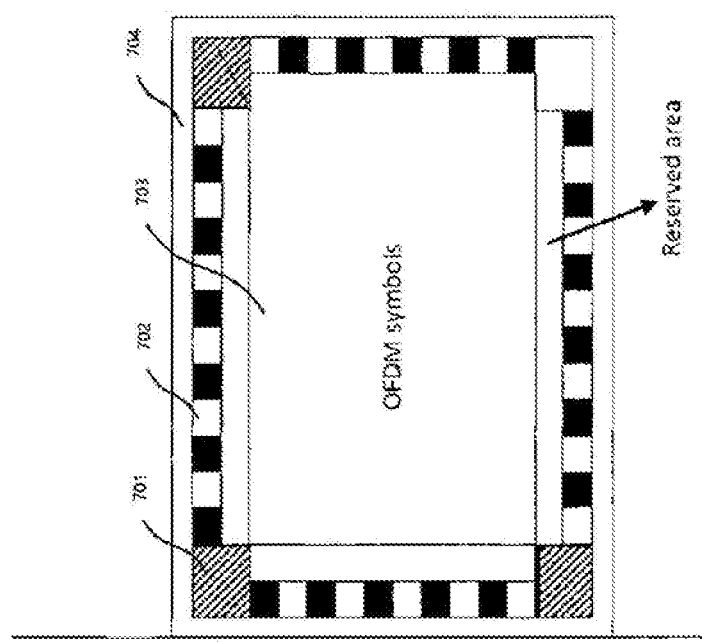

The modulator may generate one frame image based on the n second OFDM symbols, and the transmitter may display the generated frame image on the light source panel. For example, the transmitter may display the frame image as shown in FIG. 7. Referring to FIG. 7, the frame image may include rotation detection cells 701 at four corners, frame clock cells 702 at four sides, and OFDM symbol cells 703 therein. Each cell may include a plurality of pixels, and the size of the rotation detection cell may be twice the size of the OFDM symbol cell (two times in length and four times in area). The OFDM symbol cells 703 may include n OFDM symbols 705.

The rotation detection cells and the frame clock cells may flash in accordance with the frame. In the frame clock cells, adjacent cells may flash in opposite phases. The reception apparatus may determine a proper sampling rate even when there is a perspective distortion. The downsampling may allow the reception apparatus to modify the sampling rate from the fixed-resolution frame image. One of the rotation detection cells may flash in a phase opposite to the others. The reception apparatus can operate correctly even if the screen is rotated. The reception apparatus can operate correctly even when receiving a mixed frame image by a rolling shutter effect.

A code detection edge 704 may be provided at a corner of the frame image. The code detection edge may be included in the frame image or provided outside the screen. The reception apparatus may efficiently detect an OCC code using the code detection edge.

Figure 8:
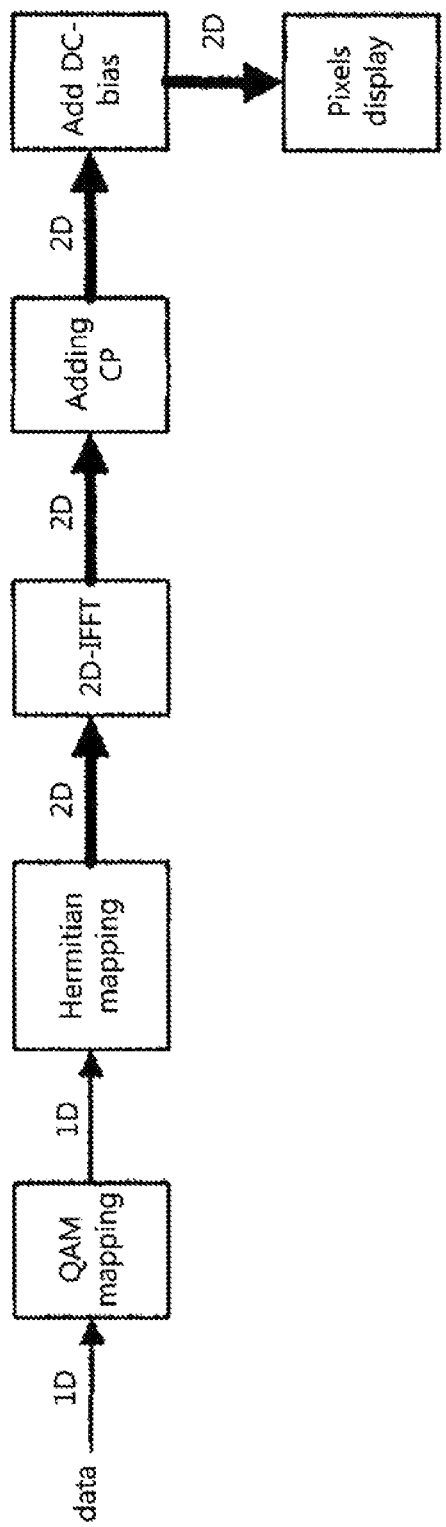
FIG. 8 is a diagram schematically illustrating an optical wireless transmission system using DC-biased optical-OFDM (DCO-OFDM) according to an exemplary embodiment of the present invention.

The Hermitian symmetric matrix may be a two-dimensional matrix. FIG. 8 is a diagram schematically illustrating an optical wireless transmission system using DC-biased optical-OFDM (DCO-OFDM) according to an exemplary embodiment of the present invention. The Hermitian symmetric matrix for DCO-OFDM may have odd rows and columns. In an exemplary embodiment of the present invention, when the Hermitian symmetric matrix for DCO-OFDM has a size of $(N_1+1) \times (N_2+1)$, the row index of each component is 0 to $N_1$, and the column index of each component is 0 to $N_2$, the component values of the Hermitian symmetric matrix may satisfy $(X_{k1,k2}=X_{N1-k1,N2-k2}^*)$. The value of the center component $X_{N1/2,N2/2}$ may be 0.

Figures 9, 10:
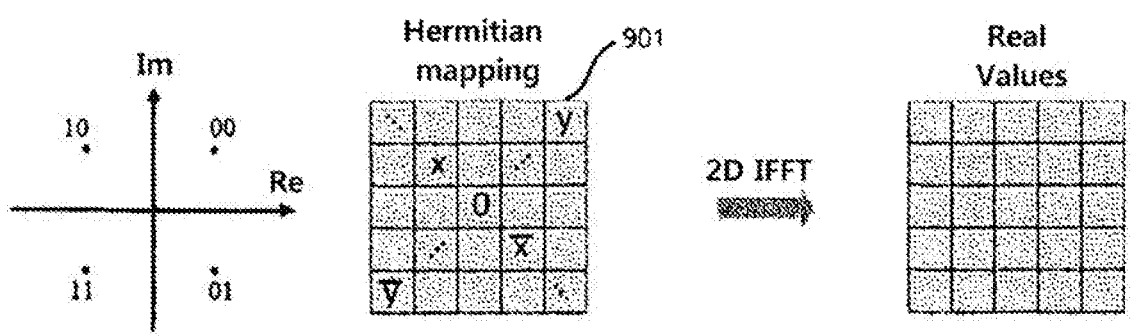
FIG. 9 is a diagram illustrating an operation procedure of an optical wireless transmission system using DCO-OFDM according to an exemplary embodiment of the present invention.
FIG. 10 illustrates a Hermitian symmetric matrix with zero padding at the edges according to an exemplary embodiment of the present invention.

For example, when the size of the Hermitian symmetric matrix has a size of $(2k+1) \times (2k+1)$, the modulator may transmit $2k(k+1)$ complex symbols through it. FIG. 9 is a diagram illustrating an operation procedure of an optical wireless transmission system using DCO-OFDM according to an exemplary embodiment of the present invention. The Hermitian symmetric matrix for DCO-OFDM may be configured as a matrix 901 shown in FIG. 9.

Since distortion may occur at the edges of the bandwidth, the modulator may add zero padding at the edge of the Hermitian symmetric matrix to avoid using edge carriers. FIG. 10 illustrates a Hermitian symmetric matrix with zero padding at the edges according to an exemplary embodiment of the present invention.

The modulator may convert the two-dimensional Hermitian symmetric matrix into a first OFDM symbol by two-dimensional IFFT. Since the size of the first OFDM symbol is the same as that of the Hermitian symmetric matrix, the size of the Hermitian symmetric matrix may be appropriately selected according to the resolution of the screen. For the shortest CP, the optimal two-dimensional OFDM symbol size that maximizes a semi-full-duplex (SFD) rate is 5×1152.

Figure 11:
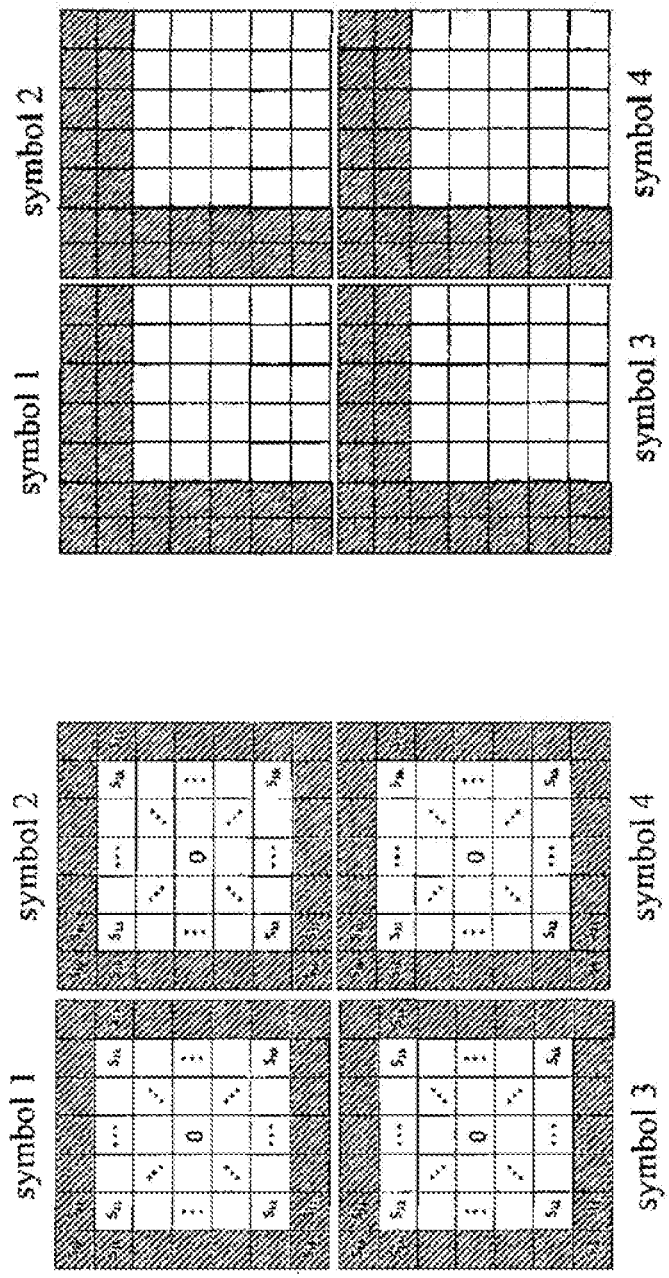
FIG. 11 is a diagram illustrating two methods for adding a CP to an OFDM symbol in an optical wireless communication system according to an exemplary embodiment of the present invention.

The modulator may generate a second OFDM symbol by adding a CP to the first OFDM symbol. FIG. 11 is a diagram illustrating two methods for adding a CP to an OFDM symbol in an optical wireless communication system according to an exemplary embodiment of the present invention. The modulator may add the CP to the edges (i.e., top, bottom, left, and right) of the first OFDM symbol as in Style 1, or add the CP to the top and bottom of the first symbol as in Style 2. The magnitude of the CP for DCO-OFDM may follow Table 1 below.

TABLE 1

| First OFDM symbol | 7 × 7 | 15 × 15 | 21 × 21 | 31 × 31 | 61 × 61 | 61 × 127 | 127 × 127 |
|---|---|---|---|---|---|---|---|
| CP row | 2 | 3 | 3 | 5 | 7 | 7 | 9 |
| CP column | 2 | 3 | 3 | 5 | 7 | 9 | 9 |
| Second OFDM symbol | 9 × 9 | 18 × 18 | 24 × 24 | 36 × 36 | 68 × 68 | 68 × 136 | 136 × 136 |

The modulator may generate a third OFDM symbol by adding a DC bias to the second OFDM symbol. This is to make the value of the OFDM symbol to a value of 0 or more so as to indicate the intensity of the light source. The modulator may add the same DC bias value to each component value of the second OFDM symbol. The modulator may generate the third OFDM symbol by scaling each component value of the second OFDM symbol to fit the intensity range of the light source. For example, the modulator may cause each component value of the third OFDM symbol to have a value from 0 to 255 by the DC bias addition and scaling so that it is displayed on an 8-bit pixel.

The modulator may convert the two-dimensional Hermitian symmetric matrix into a first OFDM symbol by two-dimensional IFFT.

The modulator may generate a second OFDM symbol by adding a CP to the first OFDM symbol. The magnitude of the CP for ACO-OFDM may be as follows.

TABLE 2

| First OFDM symbol | 8 × 8 | 16 × 16 | 32 × 32 | 16 × 32 | 64 × 64 | 32 × 64 | 128 × 128 |
|---|---|---|---|---|---|---|---|
| CP row | 1 | 2 | 4 | 2 | 4 | 4 | 8 |
| CP column | 1 | 2 | 4 | 4 | 4 | 4 | 8 |
| Second OFDM symbol | 9 × 9 | 18 × 18 | 36 × 36 | 18 × 36 | 68 × 68 | 36 × 68 | 136 × 136 |

The modulator may generate one frame image based on the n third OFDM symbols, and the transmitter may display the generated frame image on the light source panel.

Figure 12:
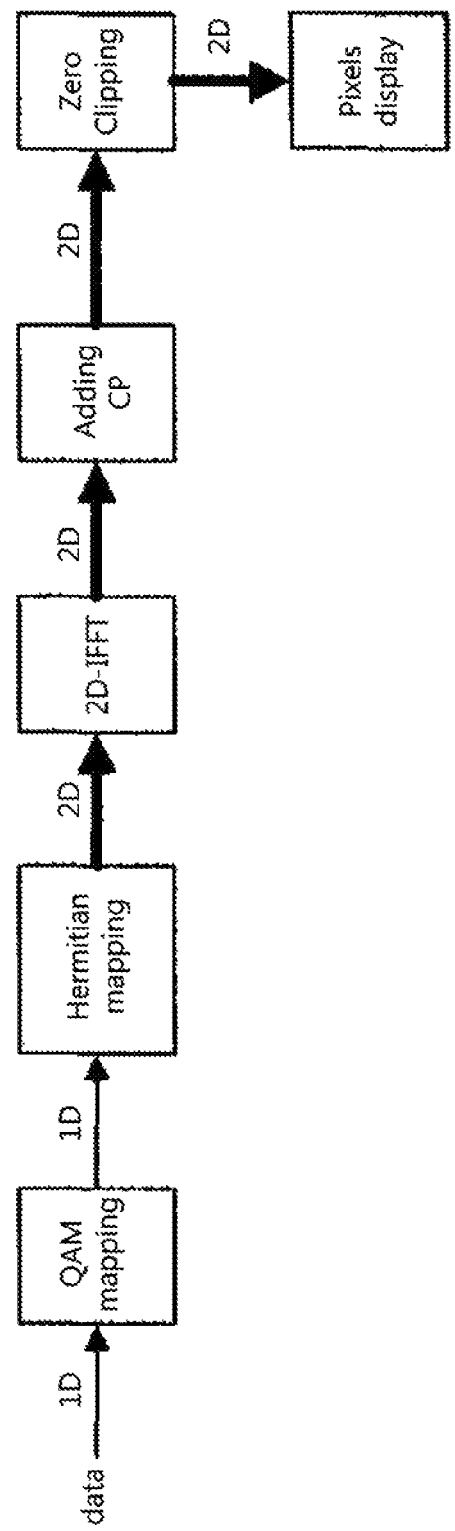
FIG. 12 is a diagram schematically illustrating an optical wireless transmission system using Asymmetrically Clipped Optical-OFDM (ACO-OFDM) according to an exemplary embodiment of the present invention.

FIG. 12 is a diagram schematically illustrating an optical wireless transmission system using Asymmetrically Clipped Optical-OFDM (ACO-OFDM) according to an exemplary embodiment of the present invention. The Hermitian symmetric matrix for ACO-OFDM may have even rows and columns. In the Hermitian symmetric matrix for ACO-OFDM, the component values of even-index columns may be set to zeros so that the transmission data is not affected by zero clipping.

In an exemplary embodiment of the present invention, when the Hermitian symmetric matrix for ACO-OFDM has a size of $(N_1+1) \times (N_2+1)$, the row index of each component is from 0 to $N_1$, and the column index of each component is from 0 to $N_2$, the component values of the Hermitian symmetric matrix may satisfy $(X_{k1,k2}=X_{N1-k1,N2+1-K2}^*)$. Accordingly, an example of the Hermitian symmetric matrix for ACO-OFDM is as follows.

$$X_{4 \times 4} = \begin{pmatrix} 0 & x_1 & 0 & \overline{x_4} \\ 0 & x_2 & 0 & \overline{x_3} \\ 0 & x_3 & 0 & \overline{x_2} \\ 0 & x_4 & 0 & \overline{x_1} \end{pmatrix}$$

In another exemplary embodiment of the present invention, the component values of the Hermitian symmetric matrix may satisfy $(X_{k1,k2}=X_{N1+1-k1,N2+1-K2}^*)$. Accordingly, an example of the Hermitian symmetric matrix for ACO-OFDM is as follows.

$$X_{4 \times 4} = \begin{pmatrix} 0 & x_1 & 0 & \overline{x_1} \\ 0 & x_2 & 0 & \overline{x_4} \\ 0 & x_3 & 0 & \overline{x_3} \\ 0 & x_4 & 0 & \overline{x_2} \end{pmatrix}$$

The modulator may perform zero clipping on the second OFDM symbol to generate a plurality of third OFDM symbols. The zero clipping replaces negative numbers with zeros in each component value. This is to make the value of the OFDM symbol to a value of 0 or more so as to indicate the brightness of the light source. The modulator may generate the third OFDM symbol by scaling each component value of the second OFDM symbol to fit the brightness range of the light source.

As described above, the optical wireless transmission system according to an exemplary embodiment of the present invention may add the CP of a different size according to the size of the OFDM symbol so that the size of the OFDM symbol by DCO-OFDM and the size of the OFDM symbol by ACO-OFDM are the same. The optical wireless transmission system according to an exemplary embodiment of the present invention can support DCO-OFDM and ACO-OFDM simultaneously.

The modulator may generate one frame image based on the n third OFDM symbols, and the transmitter may display the generated frame image on the light source panel.

Figure 13:
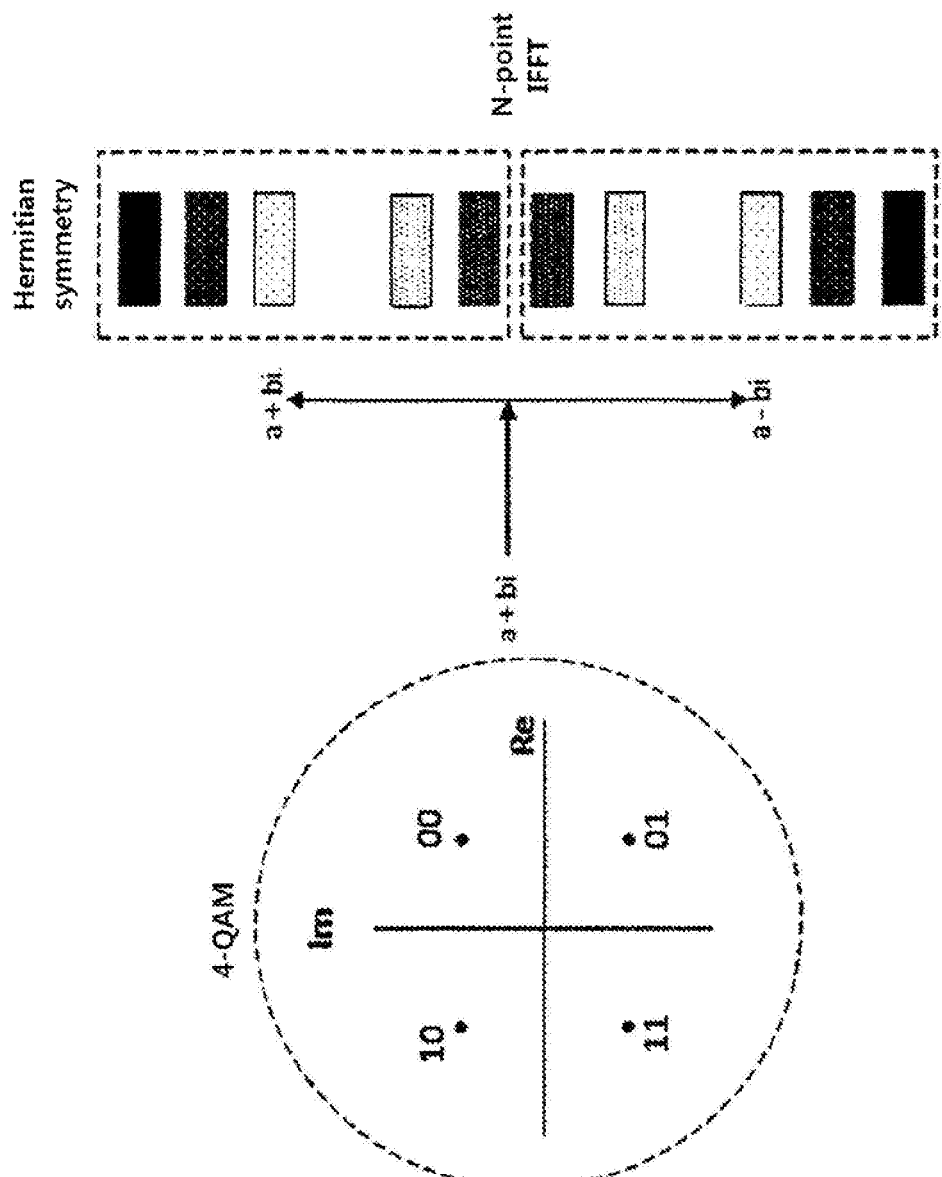
FIG. 13 is a diagram illustrating a method of converting a complex symbol sequence having a predetermined length into a one-dimensional Hermitian symmetric matrix according to an exemplary embodiment of the present invention.

The Hermitian symmetric matrix may be a one-dimensional matrix. FIG. 13 is a diagram illustrating a method of converting a complex symbol sequence having a predetermined length into a one-dimensional Hermitian symmetric matrix according to an exemplary embodiment of the present invention. When the size of the one-dimensional Hermitian symmetric matrix is (N+1), the component value may satisfy $(X_k=X_{N+1-k}^*)$.

Figure 14:
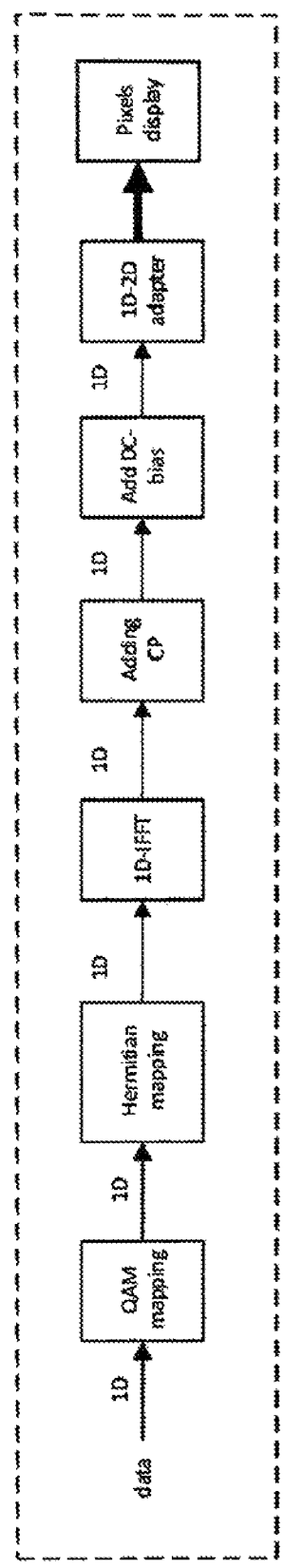
FIG. 14 is a diagram schematically illustrating an optical wireless transmission system using a one-dimensional Hermitian symmetric matrix and DCO-OFDM according to an exemplary embodiment of the present invention.

FIG. 14 is a diagram schematically illustrating an optical wireless transmission system using a one-dimensional Hermitian symmetric matrix and DCO-OFDM according to an exemplary embodiment of the present invention. The size (N+1) of the one-dimensional Hermitian symmetric matrix for DCO-OFDM may be odd. The value of the center component $X_{N/2}$ may be zero. The one-dimensional Hermitian symmetric matrix may transmit N/2 complex symbols.

The modulator may convert the one-dimensional Hermitian symmetric matrix into a first OFDM symbol by performing one-dimensional IFFT. The modulator may generate a second OFDM symbol by adding a CP to the first OFDM symbol. The modulator may generate a third OFDM symbol by adding a DC bias to the second OFDM symbol. The modulator may generate a fourth OFDM symbol by converting the third OFDM symbol into two-dimensional data to display the OFDM symbol on the two-dimensional screen. The two-dimensional data may be a two-dimensional matrix for a rectangular OFDM symbol or two-dimensional data for another form. The modulator may generate one frame image based on the n fourth OFDM symbols, and the transmitter may display the generated frame image on the light source panel. As described above, n may be 2 or more, or may be 1.

Figure 15:
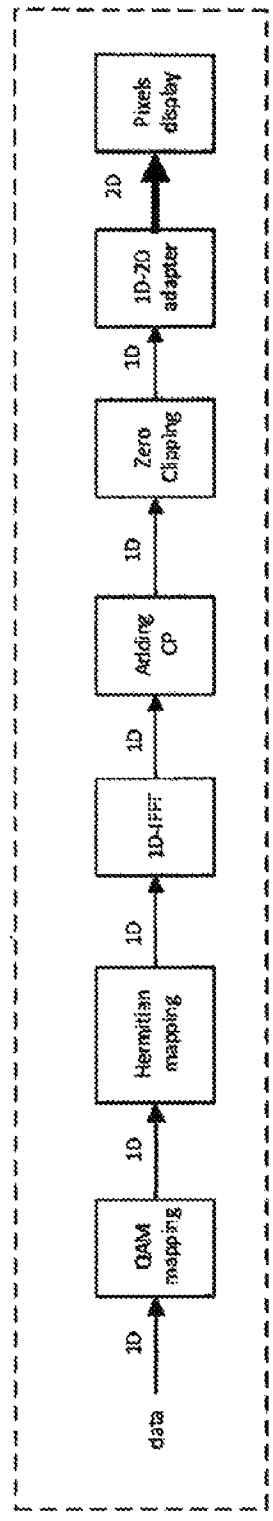
FIG. 15 is a diagram schematically illustrating an optical wireless transmission system using one-dimensional Hermitian symmetric matrix and ACO-OFDM according to an exemplary embodiment of the present invention.

FIG. 15 is a diagram schematically illustrating an optical wireless transmission system using one-dimensional Hermitian symmetric matrix and ACO-OFDM according to an exemplary embodiment of the present invention. The size (N+1) of the one-dimensional Hermitian symmetric matrix for ACO-OFDM may be even. The component values of even-th columns of the one-dimensional Hermitian symmetric matrix for ACO-OFDM may be set to zeros as follows.

$$X=[0,X_1,0,X_3,\ldots,X_N]$$

The modulator may convert the one-dimensional Hermitian symmetric matrix into a first OFDM symbol by performing one-dimensional IFFT. The first OFDM symbol is a real matrix and may satisfy ($X_k = -X_{k+N/2}$).

The modulator may generate a second OFDM symbol by adding a CP to the first OFDM symbol. The modulator may zero clip the second OFDM symbol to generate a third OFDM symbol. The modulator may generate a fourth OFDM symbol by converting the third OFDM symbol into two-dimensional data. The modulator may generate one frame image based on the n fourth OFDM symbols, and the transmitter may display the generated frame image on the light source panel.

The modulator may interleave the third OFDM symbol with the size according to the resolution of the transmission code before converting the third OFDM symbol into two-dimensional data to reduce a burst error.

Figure 16:
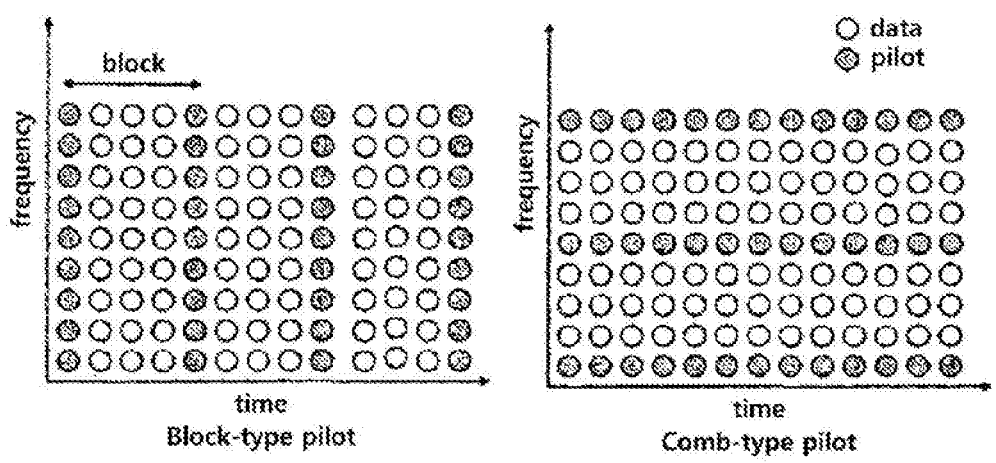
FIG. 16 is a diagram illustrating two methods of inserting pilot signals in a bidirectional optical wireless communication system using OFDM according to an exemplary embodiment of the present invention.

In a bidirectional optical wireless communication system using OFDM according to an exemplary embodiment of the present invention, channel estimation may be performed using pilot signals to optimize performance. FIG. 16 is a diagram illustrating two methods of inserting pilot signals in a bidirectional optical wireless communication system using OFDM according to an exemplary embodiment of the present invention.

The modulator may insert pilot sequences into the n Hermitian symmetric matrices. The pilot symbols may be also Hermitian symmetrical, and when using ACO-OFDM, the pilot sequences may be inserted only in the odd-th subcarriers and the even-th subcarriers may be set to zero. When using a one-dimensional Hermitian symmetric matrix, a known sequence that is a combination of 0, 1, and −1 may be used.

Referring back to FIG. 6, the modulator may receive a channel estimation signal based on the pilot symbols from an optical radio reception apparatus, convert the transmission data into n complex symbol sequences based on the received channel estimation signal (i.e., adaptive bit allocation), and allocate a power based on the received channel estimation signal (i.e., adaptive power allocation).

The receiver of the optical wireless reception apparatus using OFDM according to an exemplary embodiment of the present invention may receive images obtained by continuously photographing the light source panel from the image sensor, and the demodulator may detect a plurality of OFDM symbols from each of the received images, and restore different transmission data from each of the detected plurality of OFDM symbols.

The present invention has been described in detail focusing on the preferred embodiments shown in the drawings. These embodiments are not to restrict the present invention but only illustrative, and should be considered from the descriptive viewpoint, not restrictive viewpoint. The real technical protection scope should be defined by the technical spirit of the appended claims, not by the descriptions stated above. Although specific terms are used in the specification, they are used only for the purpose of describing the concept of the present invention, not to restrict the meaning or limit the scope of the present invention stated in the claims. Each step of the present invention does not need to be necessarily performed in the stated order and may be performed in parallel, selectively or individually. Those skilled in the art may understand that various modified forms and equivalent other embodiments are possible without departing from the fundamental spirit of the present invention. It should be understood that the equivalents include equivalents that will be developed in the future, as well as presently known equivalents, i.e., all constitutional components invented to perform the same function regardless of a structure.

The invention claimed is:

1. An optical wireless transmission method comprising:
receiving, by a modulator, transmission data and a transmission image;
generating, by the modulator, a reference image based on the transmission image;
generating, by the modulator, a data-embedded image based on the transmission data and the transmission image; and
sequentially transmitting, by a transmitter, the reference image and the data-embedded image through a light source panel,
wherein the modulator generates the data-embedded image by receiving successive transmission images, segmenting the transmission data into data blocks, inserting an asynchronous symbol into each of the data blocks based on clock information of the data blocks, and modulating each of the successive transmission images according to each data block in which the asynchronous symbol is inserted.

2. The optical wireless transmission method according to claim 1, wherein in the generating of the data-embedded image, the modulator modulates at least portion of the transmission image according to the transmission data.

3. The optical wireless transmission method according to claim 2, wherein in the generating of the reference image, the modulator does not modulate the portion of the transmission image in the data-embedded image, which is modulated according to the transmission data.

4. The optical wireless transmission method according to claim 2, wherein in the modulating of the transmission image, a change in a Chroma Blue Difference (Cb) channel of a Luna (Y) Chroma Blue Difference (Cb) Chroma Red Difference (Cr) (YCbCr) color space is less than 0.008.

5. The optical wireless transmission method according to claim 1, wherein the data-embedded image is divided into m×n cells, and one cell of the m×n cells is modulated by one bit of the transmission data.

6. The optical wireless transmission method according to claim 1, wherein each of the reference image and the data-embedded image has one or more reference cells in same positions.

7. The optical wireless transmission method according to claim 6, wherein each of the reference image and the data-embedded image has four reference cells at four corners.

8. The optical wireless transmission method according to claim 6, wherein the one or more reference cells are generated by modulating a portion of the transmission image corresponding to the one or more reference cells according to clock information.

9. The optical wireless transmission method according to claim 6, wherein clock information included in a reference cell of the reference image and clock information included in a reference cell of the data-embedded image have opposite phases.

10. The optical wireless transmission method according to claim 6, wherein each of the reference image and the data-embedded image has three or more reference cells, and clock information of one among the three or more reference cells and clock information of remaining reference cells have opposite phases.

11. The optical wireless transmission method according to claim 6, wherein the data-embedded image is generated by modulating a portion of the transmission image other than a portion corresponding to the one or more reference cells according to the transmission data.

12. An optical wireless transmission apparatus comprising:
   a modulator for receiving transmission data and a transmission image, generating a reference image based on the transmission image, generating a data-embedded image based on the transmission data and the transmission image, generating the data-embedded image by receiving successive transmission images, segmenting the transmission data into data blocks, inserting an asynchronous symbol into each of the data blocks based on clock information of the data blocks, and modulating each of the successive transmission images according to each data block in which the asynchronous symbol is inserted; and
   a transmitter for sequentially transmitting the reference image and the data-embedded image through a light source panel.

* * * * *